United States Patent
Costain et al.

(10) Patent No.: US 9,384,676 B2
(45) Date of Patent: Jul. 5, 2016

(54) SPORTING-OBJECT TRAINING DEVICE WITH SKILLS-TRAINING MODE DETECTION

(71) Applicant: Shooters Revolution LLC, Phoenix, AZ (US)

(72) Inventors: Kingsley Costain, Agoura Hills, CA (US); Ryan Holmes, Goodyear, AZ (US); Michael Johnson, Spokane, WA (US)

(73) Assignee: Shooters Revolution LLC, Phoenix, AZ (US)

( * ) Notice: Subject to any disclaimer, the term of this patent is extended or adjusted under 35 U.S.C. 154(b) by 26 days.

(21) Appl. No.: 13/905,099

(22) Filed: May 29, 2013

(65) Prior Publication Data
US 2014/0171226 A1    Jun. 19, 2014

Related U.S. Application Data

(60) Provisional application No. 61/738,697, filed on Dec. 18, 2012.

(51) Int. Cl.
| | |
|---|---|
| *A63B 43/00* | (2006.01) |
| *A63B 69/00* | (2006.01) |
| *G09B 19/00* | (2006.01) |
| *G06Q 10/06* | (2012.01) |
| *A63B 63/08* | (2006.01) |
| *A63B 41/00* | (2006.01) |

(52) U.S. Cl.
CPC ........ *G09B 19/0038* (2013.01); *G06Q 10/0639* (2013.01); *A63B 41/00* (2013.01); *A63B 43/00* (2013.01); *A63B 43/008* (2013.01); *A63B 63/083* (2013.01)

(58) Field of Classification Search
CPC ........ A63B 69/00; A63B 71/06; A63B 43/00; A63B 41/00; A63B 24/0003; A63B 24/0021; A63B 24/0062; A63B 24/0087
USPC ......... 473/570, 450, 458, 464, 447, 604, 569, 473/571, 446, 451; 482/1, 8; 434/258, 248; 463/36
See application file for complete search history.

(56) References Cited

U.S. PATENT DOCUMENTS

| | | | | |
|---|---|---|---|---|
| 4,577,865 A | * | 3/1986 | Shishido | 473/570 |
| 4,775,948 A | * | 10/1988 | Dial | A63B 69/0002 473/570 |
| 5,472,193 A | * | 12/1995 | Everman | A63B 67/14 473/570 |
| 5,810,685 A | * | 9/1998 | Willner et al. | 473/571 |

(Continued)

FOREIGN PATENT DOCUMENTS

GB    2190846 A  * 12/1987 ............. A63B 43/00

*Primary Examiner* — Mitra Aryanpour
(74) *Attorney, Agent, or Firm* — Forefront IP Lawgroup

(57) ABSTRACT

Described herein is a technology for facilitating skills-training mode in athletic sports that utilize a sporting-object. At least one implementation of that technology includes a rotational sensor configured to measure a series of angular velocities about a defined axis of a sporting object; a launch determiner configured to determine whether the sporting object is in a skills-training mode based upon one or more measured angular velocities of the series; and a trainer configured to both ascertain, during the skills-training mode, whether a consecutive sequence of measured angular velocities of the series falls within a defined range of angular velocities and generate an audible signal in response to the ascertainment.

18 Claims, 5 Drawing Sheets

(56) References Cited

U.S. PATENT DOCUMENTS

| | | | |
|---|---|---|---|
| 6,148,271 A * | 11/2000 | Marinelli | 473/570 |
| 6,582,330 B1 * | 6/2003 | Rehkemper et al. | 473/570 |
| 7,094,164 B2 | 8/2006 | Marty et al. | |
| 7,273,431 B2 * | 9/2007 | DeVall | 473/570 |
| 7,602,301 B1 * | 10/2009 | Stirling | A61B 5/1127 340/573.1 |
| 8,172,722 B2 * | 5/2012 | Molyneux | A43B 1/0054 434/247 |
| 8,231,506 B2 * | 7/2012 | Molyneux | A43B 1/0054 340/572.1 |
| 8,360,904 B2 * | 1/2013 | Oleson et al. | 473/570 |
| 8,517,870 B2 * | 8/2013 | Crowley | A63B 41/00 473/570 |
| 8,540,560 B2 * | 9/2013 | Crowley | A63B 24/0062 273/317 |
| 8,617,008 B2 * | 12/2013 | Marty | A63B 63/083 473/447 |
| 8,672,782 B2 * | 3/2014 | Homsi | A63B 43/008 473/569 |
| 8,758,172 B2 * | 6/2014 | Creguer | A63B 71/0622 473/422 |
| 9,032,794 B2 * | 5/2015 | Perkins | A63B 69/00 473/219 |
| 2004/0166912 A1 * | 8/2004 | Stienstra | 463/1 |
| 2005/0223799 A1 * | 10/2005 | Murphy | 73/510 |
| 2005/0288133 A1 * | 12/2005 | Rudell | 473/569 |
| 2007/0148624 A1 * | 6/2007 | Nativ | 434/258 |
| 2008/0312010 A1 * | 12/2008 | Marty et al. | 473/447 |
| 2009/0210078 A1 | 8/2009 | Crowley | |
| 2009/0325739 A1 * | 12/2009 | Gold | 473/570 |
| 2010/0029390 A1 * | 2/2010 | Wei | 463/43 |
| 2010/0184563 A1 * | 7/2010 | Molyneux | A43B 1/0054 473/570 |
| 2011/0066397 A1 * | 3/2011 | Kranz | G01C 22/02 702/141 |
| 2011/0118062 A1 * | 5/2011 | Krysiak | A63B 41/02 473/570 |
| 2011/0287878 A1 * | 11/2011 | Englert | A43B 1/0054 473/570 |
| 2012/0029666 A1 | 2/2012 | Crowley et al. | |
| 2012/0058845 A1 * | 3/2012 | Crowley et al. | 473/604 |
| 2012/0191397 A1 * | 7/2012 | Eatwell | A61B 5/11 73/1.79 |
| 2012/0244969 A1 * | 9/2012 | Binder | A63H 33/18 473/570 |
| 2013/0085713 A1 * | 4/2013 | Rogel | H04R 1/02 702/141 |
| 2013/0274040 A1 * | 10/2013 | Coza | G09B 19/0038 473/570 |
| 2014/0045630 A1 * | 2/2014 | Perkins et al. | 473/570 |
| 2014/0171226 A1 * | 6/2014 | Costain et al. | 473/422 |
| 2015/0072811 A1 * | 3/2015 | Jolliffe | G09B 19/0038 473/570 |
| 2015/0196811 A1 * | 7/2015 | Laurienzo | A63B 43/06 473/570 |
| 2015/0224369 A1 * | 8/2015 | Ahn | A63B 24/0087 473/570 |

* cited by examiner

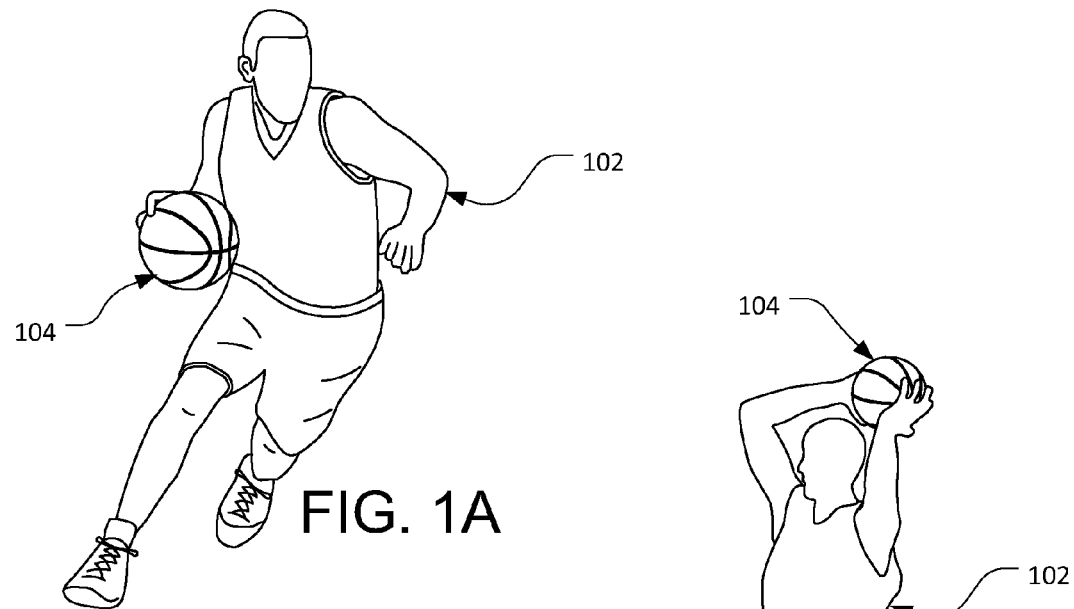
FIG. 1A
FIG. 1B
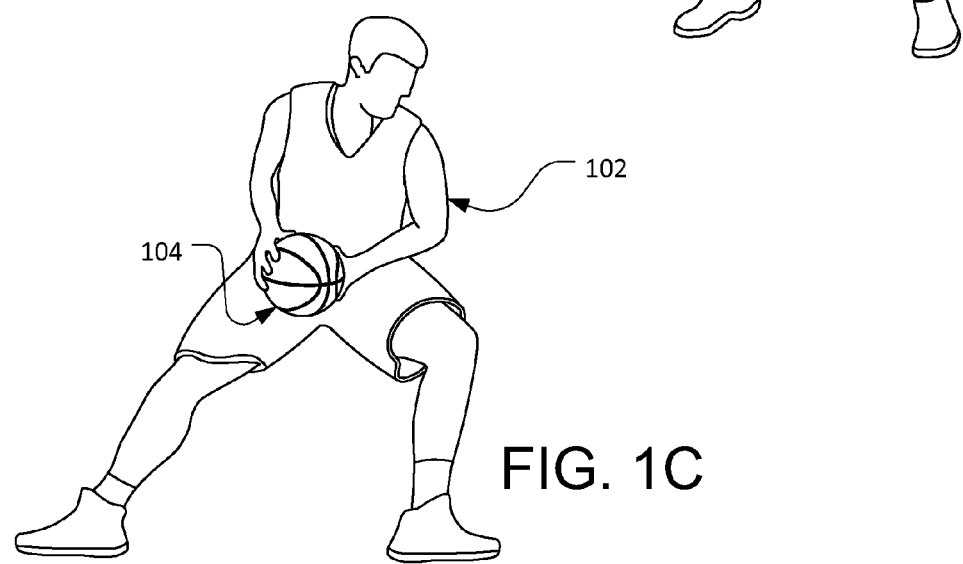
FIG. 1C

SPORTING-OBJECT TRAINING DEVICE WITH SKILLS-TRAINING MODE DETECTION

BACKGROUND

Many athletic sports involve a player throwing, kicking, pitching, shooting, striking, hitting, or launching a ball, puck, disk, or the like. Herein, the object of such sports is generally called a "sporting object."

Whether played recreationally or professionally, most players want to get better. That typically includes improving their skills in handling the sporting object. To accomplish this, players employ a variety of approaches to improve their skills. For example, such approaches include reading books, watching instructional videos, attending seminars and trainings, receiving coaching, and the like.

BRIEF DESCRIPTION OF THE DRAWINGS

FIGS. 1A-1C show example scenarios for different sporting-object handling positions during basketball training.

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Figure 2A:
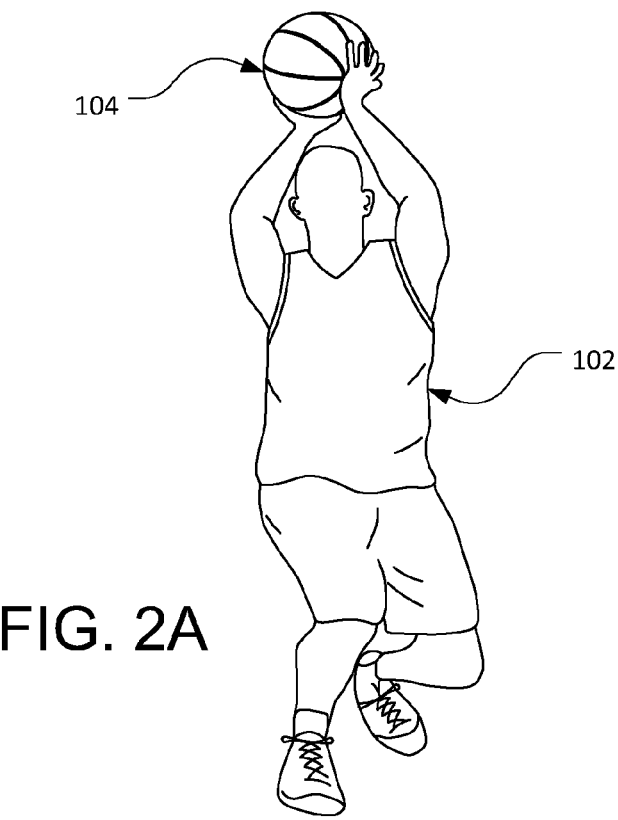
FIGS. 2A and 2B show two views of an example scenario for handling a sporting object in accordance with one or more implementations described herein.

Disclosed herein is a technology that facilitates skills training for handling a sporting object. For example, a device constructed in accordance with the discussions herein may provide immediate audible feedback to a player when she shoots a basketball. That audible feedback may indicate whether the ball was shot optimally or not.

In accordance with the technology described herein is a sensor embedded in a sporting object (e.g., basketball). The example embedded sensor measures motion properties of the sporting objects, such as the angular velocity, rotational axis, orientation, velocity, and/or corresponding acceleration of the sporting object. Based upon these data measurements, the sensor generates an audible sound to indicate when the sporting object was handled optimally. For example, in basketball, a positive sound denotes that the ball is shot properly (e.g., it has optimal spin) towards the hoop.

In basketball, for example, the sensor may help a shooter learn how to shoot an optimal shot. First, the example sensor determines whether the shooter is ready to shoot the ball. To do this, the sensor triggers a skills-training mode in response to observing that the ball rotates a minimal amount in a defined time frame. Then, presumable after the ball leaves the hands of the player, the sensor determines whether the ball has the optimal rotation that is representative of an optimal shot of a basketball. To do this, the example sensor—when in skills-training mode—ascertains whether the ball rotates at an optimal rate over another defined time frame. If so, the example sensor provides a positive audible feedback.

With the technology described herein, there is no manual switch or external signal indicting when the example sensor should enter a skills-training mode. Rather, the example sensor automatically decides (i.e., without manual and purposeful input from a human) to enter into skills-training mode based upon how the sporting object is handled.

Example Sporting-Object Training Scenarios

FIGS. 1A to 1C illustrate example scenarios for different ways of handling a basketball (which is an example of a sports object) during basketball training. For this discussion and the others related to FIGS. 2-4, presume that the skill that is the focus of the basketball training is shooting a basketball. FIGS. 1A to 1C do not depict shooting a basketball; therefore, the sensor will not generate an audible feedback to indicate a good basketball shot.

As shown, FIG. 1A illustrates a snapshot of a basketball trainee 102 dribbling a basketball 104 (which is an example of a sporting object). While dribbling, the trainee 102 maneuvers, for example, around a defender (not shown) using his hands to dribble the basketball 104. The trainee 102 performs this maneuvering to create, for example, an opportunity to score or to pass the basketball 104. For example, the trainee 102 dribbles the basketball 104 to get closer to a basketball rim to score a goal. In this example, the trainee 102 dribbles the ball on a basketball floor with one hand while walking or running down the basketball court for the field goal.

While the trainee 102 is dribbling the basketball 104, the traveling time of the ball while bouncing is typically about two tenths of a second or less. That is, it is typically two tenths of a second or less from the time that the basketball 104 leaves the fingertips of the trainee 102 to the time that it arrives and hits the floor. Similarly, the basketball 104 will have about the same travelling time from the time it bounces from the floor (i.e., point of impact) to the time that it goes back and touches the hand of the trainee 102. This occurrence may repeat depending upon number of times that the trainee 102 dribbles the basketball 104 before passing or shooting it.

An example sensor built in accordance with the technology described herein will not generate an audible feedback based upon the handling and movement of the basketball 104 shown in FIG. 1A and described above. The conditions necessary to produced such a feedback do not occur when the ball is handled in the manner shown in FIG. 1A and its associated description.

FIGS. 1B and 1C show a snapshot of example scenarios where a trainee 102 is handling the basketball 104, but not shooting the ball. For example, FIG. 1B shows the trainee 102 that is about to pass the basketball 104 to another player (not shown). FIG. 1C shows the trainee 102 protecting the ball from defenders. This action may be a precursor to passing the basketball 104 to another player or the beginning of an action that leads to shooting the ball.

Like the dribbling action depicted in FIG. 1A, an example sensor will not generate a positive audible sound in the example scenarios as shown in FIGS. 1B and 1C. In each of FIGS. 1B and 1C the trainee 102 is not shooting the basketball 104, which for this discussion is the target skill of the skills training.

Example Scenario Using the Sporting-Object Training Device

Figure 2B:
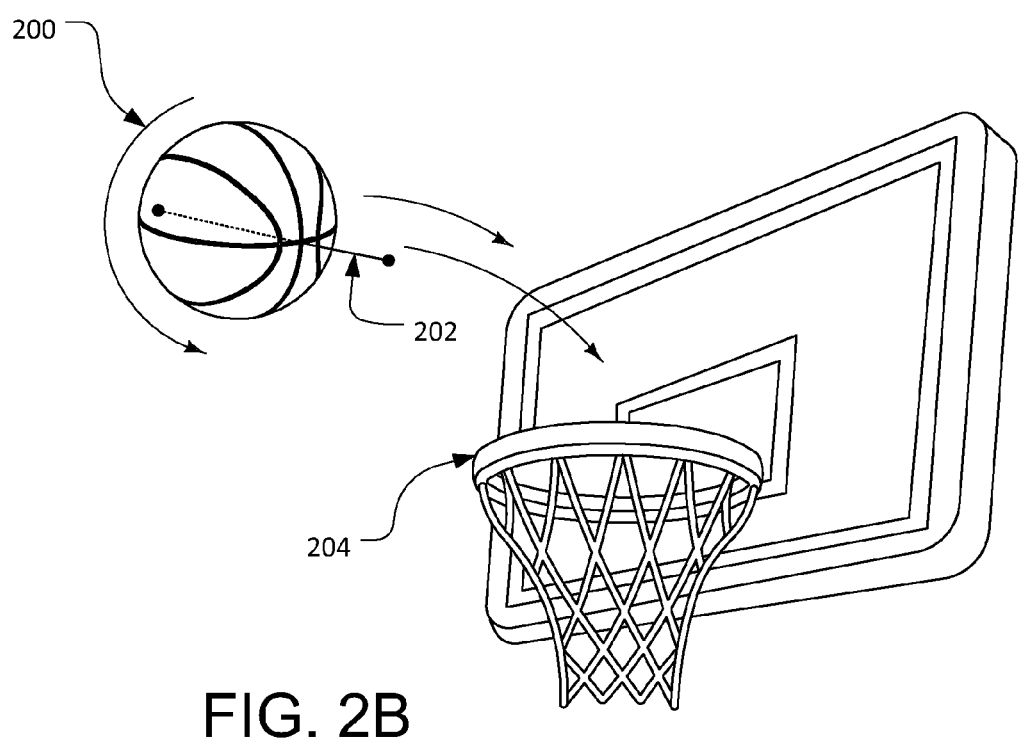

FIGS. 2A and 2B show two views of an example scenario for handling a basketball in accordance with one or more implementations described herein. For example, FIGS. 2A and 2B show the trainee 102, the basketball 104 with a rotational motion 200, a defined axis 202 for the rotational motion, and a basketball rim 204.

In basketball, an example of a shot includes a user launching the ball towards the rim 204. While there are several different types of shots in basketball, the shots discussed herein are jump shots or free throws unless the context indicates otherwise.

Basketball coaches often teach that the rotation of the basketball is an important aspect of an optimal shot. Indeed, without a proper rotation on the ball, the player's shooting percentage will likely be low. When a player shoots a basketball with an optimal rotation, the ball has the best chance to get a good bounce if it hits the rim or backboard. Improper rotation will make the basketball spin out or off the rim instead of calmly rolling in.

Rotation is the spin that is imparted on the basketball by the shooter upon the release of the ball towards the rim 204. Coaches often teach that the optimal shooting rotation should have the ball spinning from bottom to top, and not top to bottom or side to side. Thus, the optimal rotation is a backspin about a shooting axis of the ball. This shooting axis is depicted as the defined axis 202 in FIG. 2.

Herein, for the skill of shooting a basketball, the optimal rotation is around the defined axis 202 of the basketball 104 and about two revolutions (i.e., rotations) per second. A shot with an optimal rotation may be called a "good shot" herein. Within this context, "about two rotations per second" indicates a range of plus or minus a percentage around two rotations a second. That percentage range may be +/−1%, 2%, 3%, . . . , 25%. Such a range may be adjustable on a sensor implemented in accordance with the technology herein.

As noted above, the optimal spin rate may be adjustable. For example, it may be desirable to set the optimal spin rate to a value less than two rotations per second in order to allow children or less advanced shooters to progressively reach a more typical optimal range of two rotations per second.

To determine whether a shot is good or not, an example sensor embedded in the basketball 104 makes periodic measurements of angular velocity of the ball about the defined axis 202. If the example sensor measures a defined time period in which the rotation of the basketball 104 maintains an optimal rotation for a shot, then the sensor determines that the shot is good.

The example sensor accomplishes this by observing several consecutive periodic measurements where the angular velocities of the basketball 104 fall within a defined range of optimal angular velocities. With one or more implementations, the defined range of optimal angular velocities is about two rotations per second about the defined axis 202.

As shown, FIG. 2A shows the trainee 102 in a shooting position (i.e., attempting to take a shot). That is, the trainee 102 positions his hands properly as she shoots the basketball 104. Prior to the releasing of the basketball 104 and during the shooting motion, the example sensor observes a short time period of no or nearly no rotation of the basketball 104 [most shooters take about 0.75 seconds to catch and release the ball . . . our ball must be held still for about 0.45 seconds before it can be activated] about the defined axis 202. When this happens, the example sensor triggers or activates the skills-training mode. During this mode, the example sensor determines whether a shot is good or not.

For the discussion herein, the time period for triggering the skills-training mode is three tenths of a second. In some implementations, it may be four tenths or five tenths of a second or perhaps more. Indeed, the skills-training-mode-triggering time period may be adjustable in some implementations.

Alternative implementations may use a different trigger for the skills-training mode. For example, the measured acceleration of the ball may trigger the skill-training mode.

A Sporting Object with an Example Sensor

Figure 3:
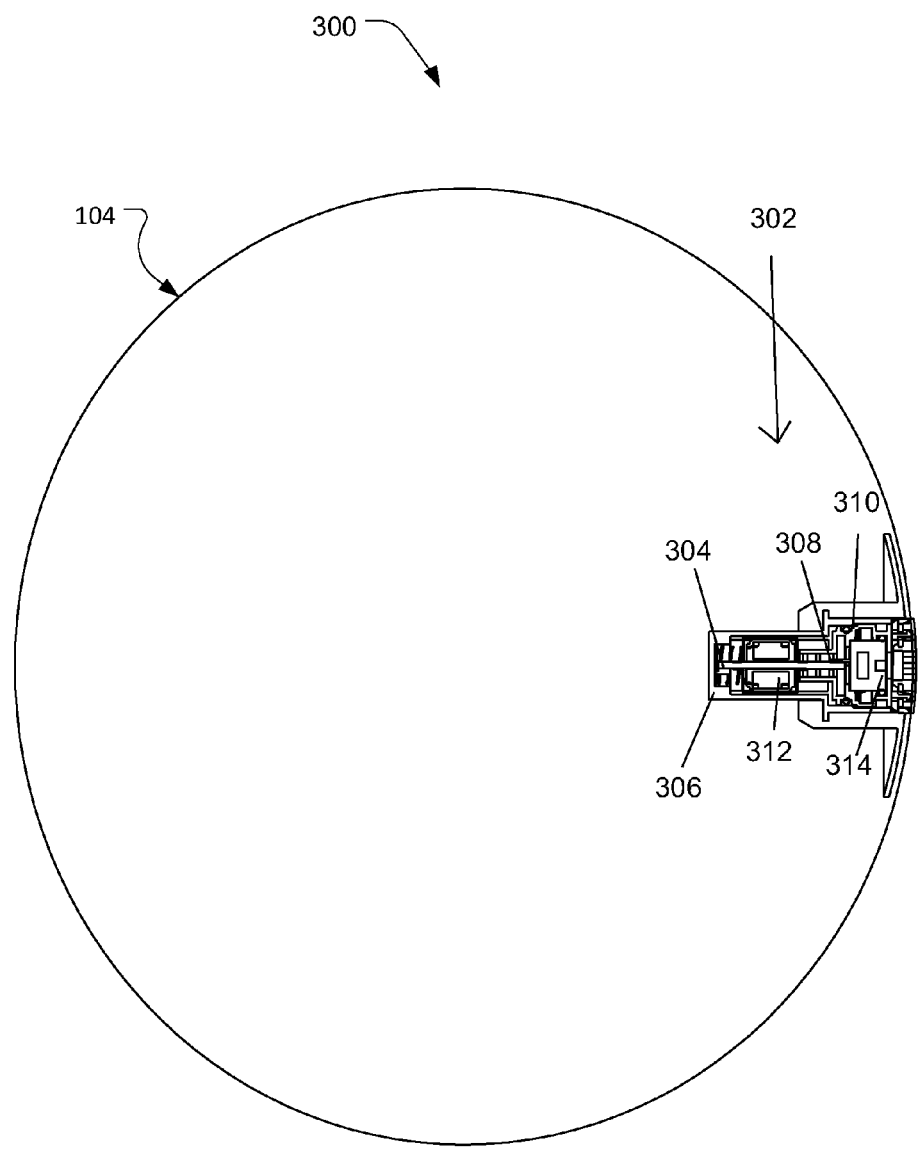
FIG. 3 is an example cross-sectional view of a sporting object with an embedded sensor that is in accordance with one or more implementations described herein

FIG. 3 shows an example cross-sectional view 300 of a basketball with an embedded sensor that is in accordance with one or more implementations described herein. FIG. 3 shows the basketball 104 and an example sensor 302. Furthermore, the sensor 302 includes a rotational sensor 304, a launch determiner 306, a gyroscope 308, a trainer 310, power source 312, and one or more processors 314.

The rotational sensor 304 is configured to measure the consecutive sequence of angular velocities, current orientation, and/or corresponding accelerations of the basketball 104. For example, the measurement is performed every one tenth of a second. The rotational sensor 304 utilizes the gyroscope 308 to perform these measurements. For example, the gyroscope 308 is used to generate a reference point for the measurements of the current orientation, acceleration, and/or angular velocities. In this example, the gyroscope 308 facilitates the orientation of the ball when measuring the consecutive sequence of angular velocities from the defined axis.

The launch determiner 306 is configured to utilize the data measurements (e.g., angular velocities, acceleration and orientation) from the rotational sensor 304. For example, the launch determiner 306 activates the skills-training mode in response to zero angular velocity in the basketball 104 over a given time period. In this example, the zero angular velocity refers to at least three consecutive measurements of angular velocity (over three tenths of a second) of zero or nearly zero angular velocity about the defined axis 202.

With the skills-training mode activated, the trainer 310 determines whether the basketball 104 attains an optimal rotation over a defined period of time, such as a half a second. That is, each measurement of angular velocity during that time period is within a defined range of the optimal rotation. If so, then the trainer 310 generates a positive audible feedback to indicate a good shot. Alternatively, the trainer 310 may generate a negative audible feedback to indicate that the shot was not good.

As depicted, the power source 312 is one or more batteries. The processor 314 may facilitate coordination and communications between the components such as, for example, the rotational sensor 304, launch determiner 306, gyroscope 308, trainer 310, and other components (e.g., memory) of the sensor 302. The processor 314 utilizes these coordination and communications to implement the facilitating of the sporting-object skills training.

Example Sporting-Object Trajectory

Figure 4:
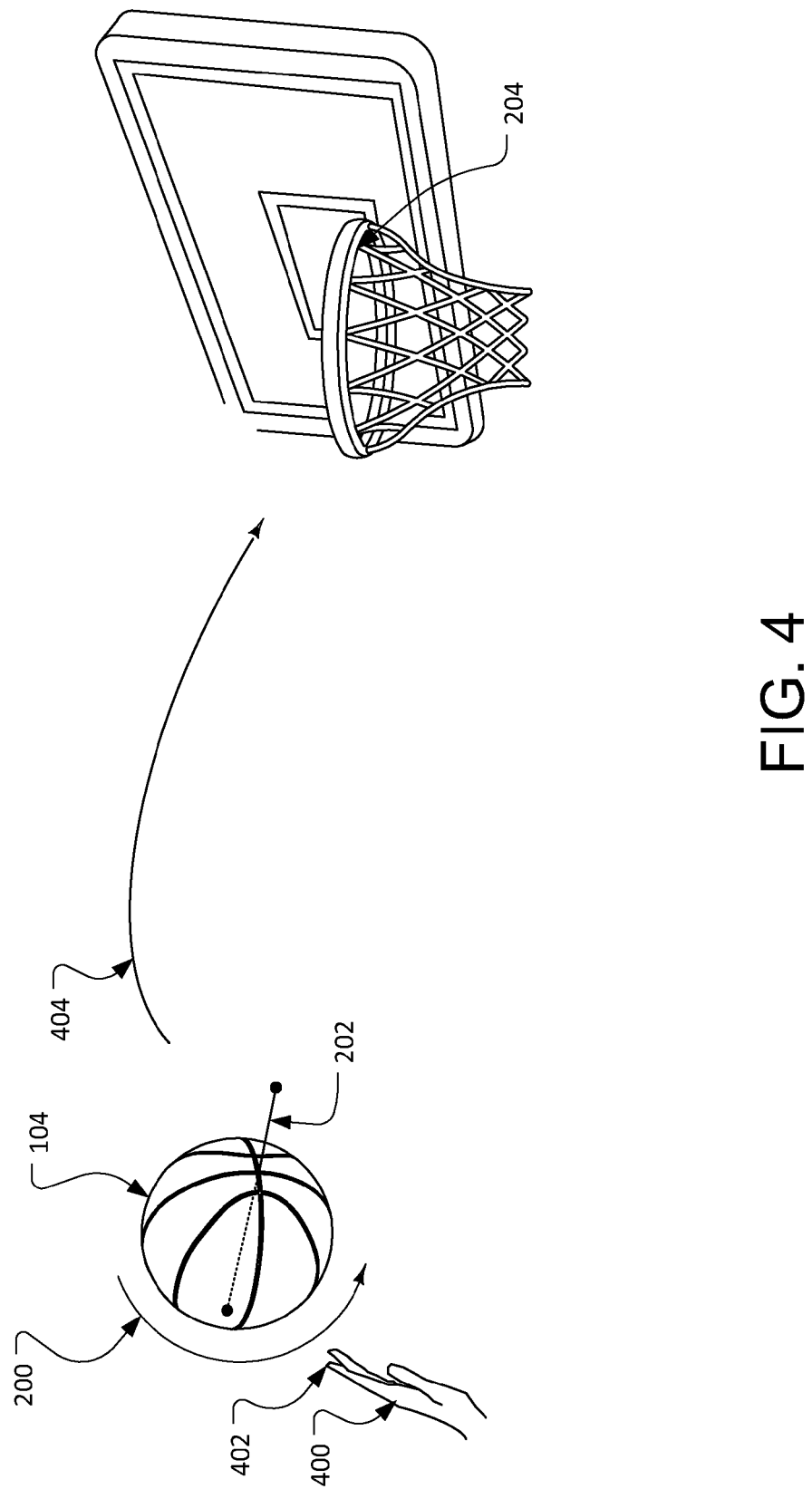
FIG. 4 illustrates a snapshot of a sporting object (e.g., basketball) during an example trajectory. This figure demonstrates the use of the sporting object in accordance with one or more implementations described herein.

FIG. 4 illustrates a snapshot of a sporting object (e.g., basketball) during an example trajectory. This figure demonstrates the use of the sporting object in accordance with one or more implementations described herein. As shown, FIG. 4 includes a shooting hand 400, a fingertips 402, and a trajectory 404.

FIG. 4 depicts the basketball 104 during the skills-training mode. Thus, the example sensor is attempting to detect whether the basketball 104 has an optimal rotation about the shooting axis.

After the ball is launched, the trainer 310 determiner determines whether there is a consecutive sequence of measured optimal angular velocities of the basketball 104 about the defined axis 202. For example, the consecutive sequence may be several (e.g., 3, 4, or 5) periodic measurements every tenth of a second or a sufficient number of measurements over that time period (e.g., 3, 4, or 5 tenths of a second). If so, then the trainer 310 generates an audible feedback indicating a good shot.

After the audible feedback, the example sensor resets. This means that it exits the skills-training mode. Furthermore, the sensor may reset after a defined time period (e.g., three seconds) after initiation of the skills-training mode. Further still, the sensor may reset whenever the ball has no or nearly no spin for defined period of time, such as two seconds.

Example Method of Facilitating Sporting-Object Skills Training

Figure 5:
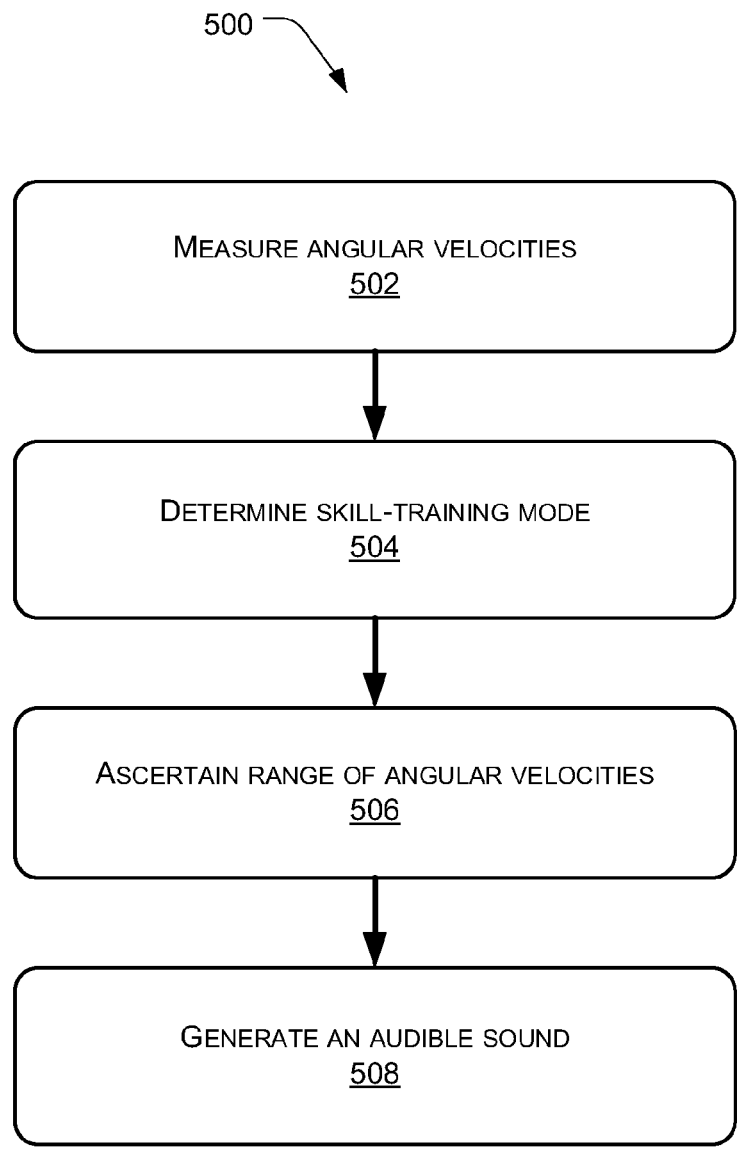
FIG. 5 is an example method for facilitating sporting-object training.

FIG. 5 shows an example process 500 illustrating an example method of facilitating sporting-object skills training. The example process 500 is performed by, for example, an embedded sensor such as sensor 302.

At block 502, the embedded sensor 302 measures angular velocities about a defined axis of a sporting object. For example, a rotational sensor (e.g., rotational sensor 304) measures a series of angular velocities of the sporting object (e.g., basketball 104) about the defined axis (e.g., defined axis 202). In this example, the basketball 104 may be held in a non-shooting position, in a shooting action, or in a dribbling position.

At block 504, the embedded sensor determines whether the sporting object is in skills-training mode based upon the measured sequence of angular velocities. For example, a launch determiner (e.g., launch determiner 306) activates the skills-training mode in response to the measured consecutive sequence of measured angular velocities of the series that represent no or nearly no angular velocity about the defined axis 202.

At block 506, the embedded sensor ascertains whether the measured consecutive sequence of angular velocities falls within a defined range of optimal angular velocities. For example, a trainer (e.g., trainer 310) ascertains whether the measured sequence of angular velocities falls within the defined range of angular velocities.

At block 508, the embedded sensor generates an audible sound based on whether the measured angular velocities fall within the defined range of optimal angular velocities. For example, if the two factors discussed above (i.e., activation of the skills-training mode and compliance with the defined range of angular velocities) are satisfied, then the trainer 310 generates the positive audible sound. Otherwise, then the trainer 310 generates no sound or, alternatively, generates a negative audible sound. Furthermore, the sporting good may exit the skills-training mode after the generation of the audible sound.

Additional and Alternative Implementation Notes

Although a basketball is the primary example of a sporting object discussed herein, the technology described herein may be applied to other sports with other types of sporting object. Other example sporting objects include a soccer ball, a softball, a baseball, a football, a cricket ball, a field hockey ball, an ice hockey puck, a tennis ball, a volleyball ball, a golf ball, a table tennis ball, a flying disc, a bowling ball, a discus, a shot, a hammer, a bocce ball, racquetball, and a curling stone.

With these other sporting objects, an example embedded sensor may be employed in accordance to the technology described herein. In particular, a set of measurements about the angular velocity, acceleration, and/or spin axes may trigger a skills-training mode and then another set of such measurements may indicate an optimal handling of that sporting object.

For example, consider football. A skills-training mode may be triggered for a football based upon the ball having no or nearly angular velocity for a specific period time while a passer prepares for passing. Then a pass may be considered a good pass if the ball maintains is angular velocity about central axis of the football for a specified time period while the ball is in flight. Each sport, sporting object, and particular skill will have its own set of data and time period that triggers its skills-training mode and that triggers an audible "good" handling feedback.

In some implementations, the timing of the audible feedback may be set to occur at or near the apex of an optimal arc of a launch, such as a basketball shot. If it is known that a basketball takes, for example, four tenths of a second after leaving the shooter's hand to reach the apex of an optimal arc, then the audible feedback can be designed to give an audible feedback at that point (presuming the shot has an optimal rotation). This apex-timed feedback will give the shoot additional confirmation of the optimal nature of their shot.

In the above description of exemplary implementations, for purposes of explanation, specific numbers, materials configurations, and other details are set forth in order to better explain the present invention, as claimed. However, it will be apparent to one skilled in the art that the claimed invention may be practiced using different details than the exemplary ones described herein. In other instances, well-known features are omitted or simplified to clarify the description of the exemplary implementations.

The inventor intends the described exemplary implementations to be primarily examples. The inventor does not intend these exemplary implementations to limit the scope of the appended claims. Rather, the inventor has contemplated that the claimed invention might also be embodied and implemented in other ways, in conjunction with other present or future technologies.

Moreover, the word "exemplary" is used herein to mean serving as an example, instance, or illustration. Any aspect or design described herein as exemplary is not necessarily to be construed as preferred or advantageous over other aspects or designs. Rather, use of the word "exemplary" is intended to present concepts and techniques in a concrete fashion. The term "technology," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

These processes are illustrated as a collection of blocks in a logical flow graph, which represents a sequence of operations that can be implemented in mechanics alone or a combination with hardware, software, and/or firmware. In the context of software/firmware, the execution of the instructions on the medium may cause performance of the operations described herein. For example, or more computer-readable media with processor-executable instructions stored thereon which when executed by one or more processors may cause performance of operations described herein.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

What is claimed is:

1. A device that facilitates skills training with a sporting-object, the device comprising:
   a rotational sensor configured to measure a series of angular velocities about a defined axis of a sporting object;
   a launch determiner configured to determine whether the sporting object is in a skills-training mode based upon one or more measured angular velocities of the series;
   a trainer configured to:
      ascertain, during the skills-training mode, whether a consecutive sequence of measured angular velocities of the series falls within a defined range of angular velocities;
      generate an audible signal in response to the ascertaining.

2. The device as recited by claim 1, wherein the launch determiner is configured to determine by:
   observing that each of a consecutive sequence of measured angular velocities of the series represent no or nearly no angular velocity about the defined axis of the sporting object;
   in response to the observing, triggering the skills-training mode.

3. The device as recited by claim 1, wherein the trainer is configured to generate the audible signal by:
   producing one or more positive sounds in response to ascertaining that the consecutive sequence of measured angular velocities of the series falls within the defined range of angular velocities.

4. The device as recited by claim 1, wherein the trainer is configured to generate the audible signal at a time after launch that corresponds to an apex of an optimal launch of the sporting object.

5. The device as recited by claim 1, wherein:
   the defined range of angular velocities is ten percent more or less of two revolutions per second of the sporting object about the defined axis.

6. The device as recited by claim 1, wherein the consecutive sequence of measured angular velocities of the series of the trainer occurs over two tenths of a second.

7. The device as recited by claim 1, wherein the consecutive sequence of measured angular velocities of the series of the launch determiner occurs over three tenths of a second.

8. The device as recited by claim 1, wherein the sporting object is selected from a group consisting of:
   a basketball, a soccer ball, a softball, a baseball, a football, a cricket ball, a field hockey ball, an ice hockey puck, a tennis ball, a volleyball ball, a golf ball, a table tennis ball, a flying disc, a bowling ball, a discus, a shot, a hammer, a bocce ball, and a curling stone.

9. A training device that facilitates training with a sporting-object, the training device comprising:
   a rotational sensor configured to measure a series of angular velocities about a defined axis of a sporting object;
   a launch determiner configured to determine whether the sporting-object is actively being handled by a user, the launch determiner making this determination based upon one or more measured angular velocities of the series, the launch determiner triggering skills-training mode of the training device in response to the determination of the launch determiner;
   a trainer configured to operate during skills-training mode; when in the skills-training mode, the trainer is configured to:
      ascertain whether a consecutive sequence of measured angular velocities of the series falls within a defined range of angular velocities; and
      generate an audible signal from the sporting-object in response to the ascertaining,
   wherein the training device is positioned within or on the sporting-object.

10. The training device as recited by claim 9, wherein the launch determiner is configured to trigger skills-training mode in response to observing that the sporting-object is not revolving.

11. The training device as recited by claim 9, wherein the launch determiner is configured to trigger skills-training mode in response to observing that each of a consecutive sequence of measured angular velocities of the series represent no or nearly no angular velocity about the defined axis of the sporting object.

12. The training device as recited by claim 9, wherein the trainer is configured to generate the audible signal by:
   producing one or more positive sounds in response to ascertaining that the consecutive sequence of measured angular velocities of the series falls within the defined range of angular velocities.

13. The training device as recited by claim 9, wherein the trainer is configured to generate the audible signal at a time after launch that corresponds to an apex of an optimal launch of the sporting object.

14. The training device as recited by claim 9, wherein:
   the defined range of angular velocities is ten percent more or less of two revolutions per second of the sporting object about the defined axis.

15. The training device as recited by claim 9, wherein the consecutive sequence of measured angular velocities of the series of the trainer occurs over two tenths of a second.

16. The training device as recited by claim 9, wherein the consecutive sequence of measured angular velocities of the series of the launch determiner occurs over three tenths of a second.

17. The training device as recited by claim 9, wherein the sporting object is selected from a group consisting of:
   a basketball, a soccer ball, a softball, a baseball, a football, a cricket ball, a field hockey ball, an ice hockey puck, a tennis ball, a volleyball ball, a golf ball, a table tennis ball, a flying disc, a bowling ball, a discus, a shot, a hammer, a bocce ball, and a curling stone.

18. A basketball that facilitates user training with the basketball, the basketball comprising:
   a spherical ball configured to be handled and shot by a user;
   a training device positioned within or on the basketball, the training device including:
      a rotational sensor configured to measure a series of angular velocities about a defined axis of the spherical ball;
      a launch determiner configured to determine when the sporting-object is actively handled by a user, the launch determiner making determination based upon one or more measured angular velocities of the series, the launch determiner triggering skills-training mode of the training device in response to the determination of the launch determiner;
      a trainer configured to operate during skills-training mode; when in the skills-training mode, the trainer is configured to:
         ascertain whether a consecutive sequence of measured angular velocities of the series falls within a defined range of angular velocities;
         generate an audible signal from the sporting-object in response to the ascertaining.

* * * * *